Aug. 6, 1968  A. J. SIPIN  3,395,581
PRESSURE MEASURING APPARATUS
Filed Sept. 29, 1965
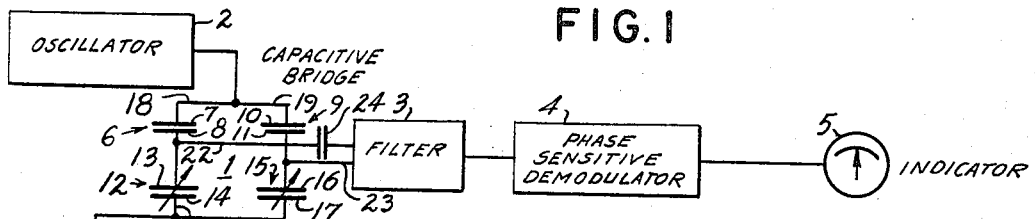
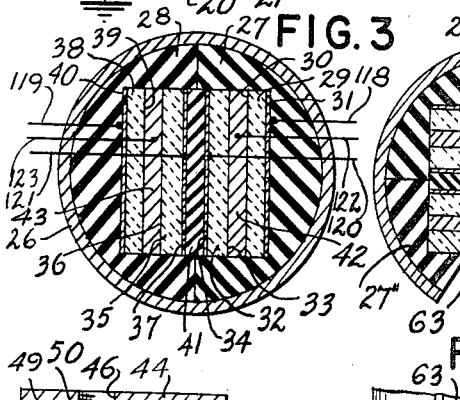
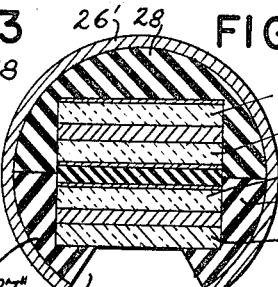
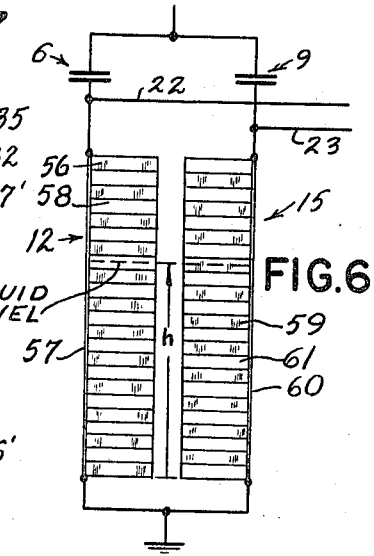
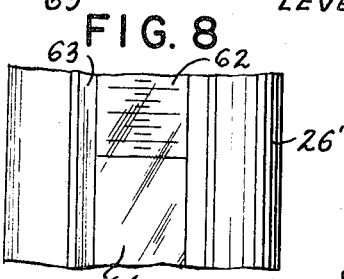
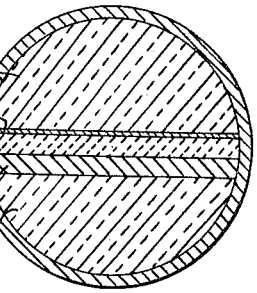
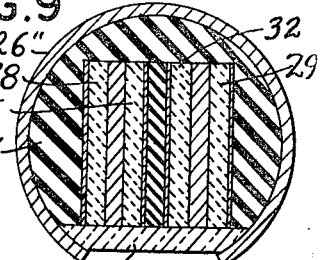
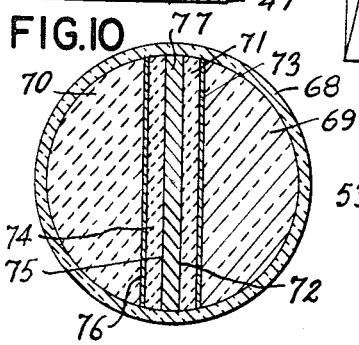
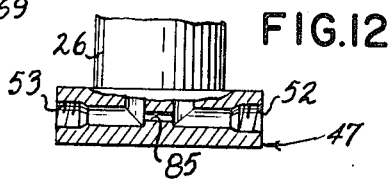
INVENTOR.
Anatole J. Sipin

United States Patent Office 3,395,581
Patented Aug. 6, 1968

3,395,581
PRESSURE MEASURING APPARATUS
Anatole J. Sipin, 117 E. 77th St.,
New York, N.Y. 10021
Filed Sept. 29, 1965, Ser. No. 491,163
23 Claims. (Cl. 73—398)

ABSTRACT OF THE DISCLOSURE

Pressure measuring apparatus including an electrical manometer with an internal cavity filled with conductive liquid and a flat dielectric plate, having one side in contact with the liquid and the other side in contact with a stationary electrode to form a pressure sensitive variable capacitor. Change in height of the column of conductive liquid in response to pressure varies the capacitance of the variable capacitor, providing an output to indicate pressure.

---

This invention relates to apparatus for measuring fluid pressure, having an electrical output.

There is need for a relatively inexpensive instrument that can measure absolute or differential pressure with high sensitivity and high accuracy and that provides an electrical output which can be some desired function of the applied pressure.

Existing pressure transducers using the extension of an elastic member as a measure of applied pressure have limited resolution, which is a constant fraction of the full scale output, thus limiting the range or accuracy of measurement. Such transducers of the strain gage, variable inductance or variable capacitance types cannot supply an output which is a function of the applied pressure. Transducers that utilize tapered potentiometers to supply an output function are most frequently inaccurate and expensive. Electrical manometers exist where the height of a pressurized liquid column is measured accurately by a servo follower; and the servo system can supply an output which is a function of the height; but these systems are very expensive and have relatively slow responses. Differential pressure transducers using elastic sensing elements cannot normally tolerate high over-pressures and maintain desired sensitivity. Such transducers are unable to measure small differential pressures at high absolute pressure levels.

One of the objects of this invention is to provide pressure measuring apparatus with an electrical output of high accuracy and sensitivity.

Another object of this invention is to provide pressure measuring apparatus with an electrical output that is a desired function of the applied pressure.

A third object of this invention is to provide pressure measuring apparatus with multiple electrical outputs which are different functions of the applied pressure.

A fourth object of this invention is to provide a pressure sensor giving a visual indication as well as an electrical output.

A further object of this invention is to provide pressure measuring apparatus capable of measuring small differential pressures at high values of absolute pressure.

Still another object of the invention is to achieve a simple and inexpensive construction for a pressure sensor capable of meeting the foregoing objectives.

The invention utilizes a specially constructed manometer in which variations of the height of one or more columns of electrically conductivity liquid alter the branch values of a capacitive bridge so that the bridge imbalance voltage is a direct indication of the change in height of the liquid column or of some function of the height. The advantages of this instrument are that an electrical reading can be obtained with an accuracy and resolution associated with liquid column manometers and not attained with elastic element transducers. Also a multiple use device is achieved in which visual and electrical readings can be obtained simultaneously or where several outputs, which are different functions of pressure, can be obtained from a single manometer.

Pressure sensors have previously been described in which the height of a conductive liquid, such as mercury, within a tube has been measured by using the conductive liquid column within the tube as the movable electrode of a variable capacitor and a conductive surface on the outside of the tube as the fixed electrode.

This construction obviously stems from visual gage practice where the tube is made of glass or other transparent material so that the liquid level can be easily observed. Such construction is not the most desirable for a variable capacitor as the accuracy and linearity of the capacitor depend directly on the precision with which the thickness of the dielectric element can be maintained along the length of the element. If the tube is made of a machinable plastic the dielectric constant of the material will be so low that a very thin wall would be required to achieve a usable value of capacitance. For good accuracy the tolerance on the thickness should be 1% or less of the thickness itself. Therefore, a practical thickness would be not less than 1/10 inch. The capacitance value would be very small and the pressure measurement hampered by stray capacitance, signal pickup and loading effects due to capacitive input impedance of indicating equipment. The capacitance value can be increased by using a material with a high dielectric constant such as a titanium oxide ceramic. The material is very hard and the dielectric element would have to be ground to the required thickness. Such grinding would be difficult and expensive for a tubular member; but it would be much less expensive for a rod or plate where only one dimension need be controlled rather than two dimensions as in a tube.

It is a feature of this invention that the dielectric element be a solid longitudinal element with a first longitudinal face in contact with the conductive liquid and an opposite face, isolated from the first face in contact with the fixed electrode of the variable capacitor.

Several embodiments of the invention are described hereinafter in connection with the following drawings, disclosing various specific features and advantages.

In the drawings,

FIG. 1 is a combined circuit and block diagram of electrical components utilized in the preferred form of the invention.

FIG. 2 is a preferred structure for the variable capacitors of the circuit shown in FIG. 1.

FIG. 3 is a sectional view taken on lines 3—3 in FIG. 1.

FIG. 4 is a detail showing constructional features of dielectric elements used in the structure shown in FIG. 2 and FIG. 3.

FIG. 5 is a detail showing constructional features of a dielectric element used in a system providing an output which is an analog function of fluid pressure.

FIG. 6 is a schematic diagram illustrating constructional features of variable capacitors used in a system providing an output which is a digital function of fluid pressure.

FIG. 7 is a sectional view of a variable capacitor similar to the preferred structure of FIG. 2 with provision for viewing as well as electrical output.

FIG. 8 is a fragmentary elevation view of the variable capacitor shown in FIG. 7.

FIG. 9 is a sectional view of another variable capacitor similar to the preferred structure of FIG. 2 with provision for viewing as well as electrical output.

FIG. 10 is a sectional view of a variable capacitor with two dielectric elements.

FIG. 11 is a sectional view of a variable capacitor with a single dielectric element.

FIG. 12 is a fragmentary view of part of the variable capacitor shown in FIG. 2.

The pressure measuring system shown in FIG. 1 includes a capacitive bridge circuit 1, energized by alternating voltage supplied by an oscillator 2 at constant amplitude. The output of bridge circuit 1 is fed to an electrical filter 3 from which the signal passes to a phase sensitive demodulator. The phase sensitive demodulator supplies a voltage proportional to the bridge output voltage to an indicator 5.

Capacitive bridge 1 consists of a fixed capacitor 6 with electrodes 7 and 8, fixed capacitor 9 with electrodes 10 and 11, variable capacitor 12 with electrodes 13 and 14 and variable capacitor 15 with electrodes 16 and 17. Capacitors 6 and 12 form one branch of the bridge, and capacitors 9 and 15 form a parallel branch of the bridge. The alternating voltage is applied to electrodes 7 and 10 through leads 18 and 19. Electrodes 14 and 17 are connected to ground by leads 20 and 21. The bridge imbalance voltage is led out through leads 22 and 23, lead 22 being connected between capacitors 6 and 12 and lead 23 being connected between capacitors 9 and 15. Capacitor 24 in the bridge output is used for impedance matching with the other circuit elements.

Filter 3 is used to reject spurious frequencies picked up by the bridge leads and signal transmission cable. The most serious interference would be at power supply frequencies, which would be considerably below bridge excitation frequency. The filter can be of the high-pass type, band-pass type tuned to excitation frequency, or band-reject type tuned to power frequency. The filter should desirably be placed as close as possible to the output elements.

Phase sensitive demodulator 4 is required when differential pressure is measured of both positive and negative polarities. The amplitude of the bridge voltage output will be related to the magnitude of differential pressure; and the phase will be at zero degrees with respect to the excitation voltage when the differential pressure has one polarity and at 180 degrees when the differential pressure has the opposite polarity.

The indicator can be of any known type displaying a voltage input.

Variable capacitors 12 and 15 of bridge 1 are pressure sensing capacitors of the type shown in FIG. 2 in which the variable electrode of each capacitor is a column of conductive liquid. The columns move in opposite directions from a null datum when pressure is applied. Letting $e_o$ represent the bridge output voltage, $e_i$ represent the excitation voltage, $C_o$ be the value of fixed capacitances 6 and 9 as well as the unpressurized value of variable capacitances 12 and 15, and C represent the change in capacitance of each variable capacitor with an application of pressure:

$$C_o = \left(\frac{C}{2C_o}\right) e_i$$

If the change of capacitance is uniform along the length of the variable capacitor as the column of conductive liquid extends from its datum, the bridge output voltage is directly proportional to the applied pressure. A functional relationship can be achieved between pressure and output voltage by varying the change of capacitance along the length of the capacitor.

The dielectric material in variable capacitors 12 and 15 will have a dielectric constant that changes with temperature, thus making the change of capacitance with pressure and the bridge output voltage functions of pressure. This temperature sensitivity is eliminated by using the same dielectric material in fixed capacitors 6 and 9 as that used in variable capacitors 12 and 15 and by placing all capacitors in close proximity so that they experience the same temperature.

For best impedance matching capacitor 24 should also be located near the bridge.

The circuit shown in FIG. 1 is a half bridge, since only two pressure variable capacitors are used. A full bridge can be achieved by making capacitors 6 and 9 pressure variable also. In this case the bridge output voltage, $$C_o = \left(\frac{C}{C_o}\right) e_i$$

showing twice the gain of the half-bridge.

FIGS. 2 and 3 show a preferred embodiment for pressure sensing variable capacitors. The structure includes a housing 25 consisting of an outer tube 26, made of metal or other strong material, two insulators 27 and 28 forming a longitudinal internal cavity, and a third longitudinal insulator 41 dividing the internal cavity into two smaller longitudinal cavities. Within one of the two longitudinal cavities there are a first longitudinal dielectric element 29 with a flat side 30 and an opposite side in contact with an electrically conductive layer 31, against an internal side of insulator 27 and a second longitudinal dielectric element 32 with a flat side 33 facing flat side 30 of dielectric element 29 and an opposite side in contact with a conductive layer 34 against one side of insulator 41. Within the other of the two smaller longitudinal cavities there is a third dielectric element 35 with a flat side 36 and an opposite side in contact with a conductive layer 37 against the opposite side of insulator 41 and a fourth dielectric element 38 with a flat side 39 facing flat side 36 of dielectric element 35 and an opposite side in contact with a conductive layer 40 against an internal side of insulator 28. Cavity 42 between flat sides 30 and 33 and cavity 43 between flat sides 36 and 39 are both charged with conductive liquid, forming the movable electrodes of the pressure sensing variable capacitors.

On one end of the variable capacitor assembly there is a header 44 with a port 45 connecting with cavity 42 and a port 46 connecting with cavity 43. A check valve 48 to prevent overflow of conductive liquid from cavity 43 is shown between cavity 43 and port 46 in header 44. The check valve consists of a ball 49, which is buoyant in the conductive liquid, a valve seat 50 above the ball and a porous ball retaining plate 51. If the pressure at the bottom of the liquid column in cavity 43 is excessive the liquid will be forced through pores or holes in retaining plate 51, floating ball 49. If the liquid rises still more the ball will mate with seat 50 preventing escape of the liquid from port 46.

On the other end of the variable capacitor assembly there is a base 47 with a port 52 connecting with cavity 42 and a port 53 connecting with cavity 43.

The structure shown in FIG. 3 cannot be connected as a full bridge although it includes four variable capacitors. This is because each pair of capacitors that varies in the same direction has a common movable electrode, namely, the conductive liquid between the dielectric elements. In a full bridge the capacitors that vary in the same direction have no common electrode. However, if ports 52 and 53 are connected each pair of corresponding variable capacitors can be connected into a separate half-bridge circuit. Here the conductive liquid must be an electrode that can be common to both bridges. For example, lead 122 can provide excitation voltage to the liquid in cavity 42, and the liquid in cavity 43 can be connected to ground through lead 123. Leads 118 and 119 would provide the output voltage for one of the two bridges, and leads 120 and 121 would provide the output voltage for the other bridge. The advantage here is that two separate functions of pressure can be provided by a single structure. One pair of variable capacitors can provide an output varying linearly with pressure; the other pair of variable capacitors can be tapered to provide an output varying as the square root of pressure, for example.

The construction of the variable capacitors is subject to many variations. The fixed conductive layers can be separately assembled; they can be bonded to the dielectric elements; they can be conductive coatings on the dielectric elements. FIG. 4 shows a detail of FIG. 2 in which dielectric elements 32 and 35, conductive layers 34 and 37 and insulator 41 are bonded together and assembled into housing 25 as a unit. FIG. 5 shows one method of tapering a capacitor so that the capacity variation is a non-linear function of the height of conductive liquid. Here a flat, rectangular dielectric substrate 54 has a bonded conductive layer whose width is varied along the length of the substrate to provide a desired function of height of conductive liquid. Alternatively, the thickness of the dielectric or the width of the cavity retaining the conductive liquid can be varied along the length of a dielectric element.

FIG. 6 shows a circuit arrangement and conductive layer configuration to provide an output which is a digital function of liquid height. The circuit is the half bridge of FIG. 1 with capacitors 12 and 15 varying in the same direction; that is they have a common conductive liquid electrode with a height $h$. Capacitor 12 has a dielectric element with alternate conductive strips 56, connected into the circuit by common conductor 57, and non-conductive spaces 58 of equal height alternating with the conductive strips. Capacitor 15 is similarly constructed with conductive strips 59, common conductor 60 and non-conductive spaces 61. Capacitors 12 and 15 are staggered so that the height of a conductive strip 56 coincides with that of a space 60 and the height of a conductive strip 59 coincides with that of a space 58. When the liquid level coincides with a space 58 and conductive strip 59, the bridge output on leads 22 and 23 will be a voltage of one polarity. If the liquid level changes height $h$ to coincide with a conductive strip 56 and a space 60 the bridge output changes polarity. The number of polarity changes can be determined by suitable circuitry and counted as a measure of liquid height or pressure.

FIGS. 7 and 8 show a variation of the structure in FIGS. 2 and 3 to provide a visual indication of liquid level as well as an electrical output. A slotted tube 26′ is used in place of tube 26 and right and left insulators 27′ and 27″ are used in place of insulator 27 providing a vertical viewing area 63. A graduated sight glass 62 replaces dielectric element 29 and conductive layer 31 so as to permit visual measurement of the height of conductive liquid 64 in cavity 42.

FIG. 9 shows another variation of the structure in FIGS. 2 and 3 to provide a visual indication of liquid height. Tube 26″ with a slot 66 replaces tube 26; and insulator 67 replaces insulators 27 and 28. Sight glass 65 is placed in viewing slot 66 along the edges of the dielectric elements, providing an edge view of the height of liquid in both cavities 42 and 43.

FIG. 10 shows a variable capacitor assembly having two dielectric elements 71 and 74, with flat sides 72 and 75 and conductive backing 73 and 76. The dielectric elements are retained by insulators 69 and 70 in a transparent outer tube 68. Cavity 77 for the conductive liquid is formed between flat sides 72 and 75. The transparent outer tube permits edge viewing of the liquid column in cavity 77.

A variable capacitor assembly is shown in FIG. 11 with only a single dielectric element 81 with a flat side 82 and an opposite conductive layer 83 in contact with an insulator 79. Insulator 80 is opposite flat side 82 and spaced from it to form cavity 84 for the conductive liquid.

FIG. 12 is a detail of the base 47 of the variable capacitor shown in FIG. 2 in which ports 52 and 53 are internally connected by passage 85, connecting the liquid in cavities 42 and 43 to permit operation as a half bridge.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. Apparatus for measuring fluid pressure, including an electrical capacitive circuit with pressure sensitive variable capacitors to unbalance the circuit when the pressure deviates from a reference, each pressure sensitive variable capacitor including a longitudinal housing, a solid flat dielectric element within the housing with a first face extending longitudinally with the housing and a second face opposite the first face, a longitudinal cavity within the housing contiguous with the first face and isolated from the second face, a column of electrically conductive liquid within the cavity, constituting a first electrode of the capacitor and extending along the first face of the dielectric element from a datum proportionally to the applied pressure, a conductive layer in contact with the second face of the dielectric element constituting the second electrode of the capacitor, and means for applying the fluid pressure to one end of the liquid column and a reference pressure to the other end; means for applying an alternating voltage to the capacitive circuit; and means sensitive to the electrical imbalance of the circuit for indicating fluid pressure.

2. Apparatus for measuring fluid pressure of the character claimed in claim 1 in which the electrical capacitive circuit is a full bridge with four capacitors, of which two of the capacitors are pressure sensitive variable capacitors, arranged so that the liquid column of one variable capacitor is elevated from its datum and the liquid column of the other variable capacitor is depressed from its datum when the fluid pressure changes and two of the capacitors are fixed.

3. Apparatus for measuring fluid pressure of the character claimed in claim 1 in which the same dielectric material is used in all capacitors of the capacitive circuit.

4. Apparatus for measuring fluid pressure of the character claimed in claim 2 in which all of the capacitors are pressure sensitive variable capacitors arranged so that the extensions of the liquid columns of corresponding capacitors of the two branches of the bridge are in opposite directions when the fluid pressure changes.

5. Apparatus for measuring fluid pressure of the character claimed in claim 1 in which an impedance matching capacitor is connected between the capacitive circuit and the indicating means.

6. Apparatus for measuring fluid pressure of the character claimed in claim 1 in which an electrical filter is connected between the capacitive circuit and the indicating means.

7. Apparatus for measuring fluid pressure of the character claimed in claim 1 in which the indicating means includes a phase sensitive detector for indicating the direction of pressure change.

8. Apparatus for measuring fluid pressure of the character claimed in claim 1 in which the second electrode of a pressure sensitive variable capacitor is a column of conductive liquid exposed to the fluid pressure and arranged so as to extend in an opposite direction to the first electrode when the fluid pressure changes.

9. Apparatus for measuring fluid pressure of the character claimed in claim 1 in which the second electrode of a pressure sensitive variable capacitor is a fixed solid layer and its width is varied along the length of the dielectric element so that the capacitance is a function of the extension of the liquid column along the length of the first face of the element to provide an output which is a function of the fluid pressure.

10. Apparatus for measuring fluid pressure of the character claimed in claim 1 in which the second electrode of a pressure sensitive variable capacitor is a fixed solid layer and the thickness of the dielectric element is varied along its length so that the capacitance is a function of the extension of the liquid column along the length of the first face of the element to provide an output which is a function of the fluid pressure.

11. Apparatus for measuring fluid pressure of the character claimed in claim 1 in which the width of the cavity retaining the liquid column in a pressure sensitive variable capacitor is varied along the length of the cavity so that the capacitance is a function of the extension of the liquid column along the length of the first face of the dielectric element to provide an output which is a function of the fluid pressure.

12. Apparatus for measuring fluid pressure of the character claimed in claim 1 in which the second electrode of a pressure sensitive variable capacitor is a series of conductive strips across the width of the second face of the dielectric element, said strips being equally spaced along the length of the element and connected in parallel to a continuous conductor so that the capacitance varies incrementally with the extension of the liquid column along the length of the first face of the element to provide an output which is a digital function of the fluid pressure.

13. Apparatus for measuring fluid pressure of the character claimed in claim 12 in which the electrical capacitor circuit is a full bridge, of which two corresponding bridge capacitors, one in each branch, are pressure sensitive variable capacitors, and the location of conductive strips on the second face of the dielectric element of one variable capacitor coincides with the location of spaces between conductive strips on the second face of the dielectric element of the other variable capacitor.

14. An electrical manometer including a housing with a longitudinal axis, a cavity within the housing co-axial with the longitudinal axis, a first port in the housing connecting to one end of the cavity, a second port in the housing connecting to the other end of the cavity, a dielectric plate within the housing with a first, flat, side contiguous to the cavity along its length and a second, opposite, side isolated from the cavity, a layer of electrically conductive material in contact with the second side of the dielectric plate, a first electrical lead terminated at an electrode within the cavity and a second electrical lead connected to the electrically conductive layer.

15. An electrical manometer of the character described in claim 14 in which the housing includes a transparent part on the side of the cavity opposite the dielectric element.

16. An electrical manometer including a housing with a longitudinal axis, a cavity within the housing co-axial with the longitudinal axis, a first port in the housing connecting to one end of the cavity, a second port in the housing connecting to the other end of the cavity, a first dielectric plate within the housing with a flat side contiguous to the cavity along its length and an opposite side, isolated from the cavity and in contact with a first layer of electrically conductive material, a second dielectric plate within the housing with a flat side contiguous to the cavity along its length and an opposite side, isolated from the cavity and in contact with a second layer of electrically conductive material, a first electrical lead connected to the first conductive layer, a second electrical lead connected to the second conductive layer, and a third electrical lead terminated at an electrode within the cavity.

17. An electrical manometer of the character described in claim 15 in which the housing is transparent at the edges of the cavity and the dielectric plates to permit viewing of the cavity.

18. An electrical manometer including a housing with a longitudinal axis, first and second cavities within the housing with axes parallel to and symmetrical with respect to the longitudinal axis, first and second ports connected respectively to the first and second cavities at one end of the housing, third and fourth ports connected respectively to the first and second cavities at the other end of the housing, first and second dielectric plates within the housing with flat sides contiguous to the first cavity along its length and opposite sides isolated from the first cavity and respectively in contact with first and second layers of electrically conductive material, third and fourth dielectric plates within the housing with flat sides contiguous to the second cavity along its length and opposite sides isolated from the second cavity and respectively in contact with third and fourth layers of electrically conductive material, a first electrical lead connected to the first conductive layer, a second electrical lead connected to the second condutive layer, a third eletrical lead connected to the third conductive layer, a fourth electrical lead connected to the fourth conductive layer, an electrode within the first cavity and an electrode within the second cavity.

19. An electrical manometer of the character described in claim 18 in which the two cavities are connected at one end of the housing by a passage joining the third and fourth ports.

20. An electrical manometer of the character described in claim 18 in which one of the dielectric plates near the housing wall is made of transparent material, the corresponding conductive layer is removed and the housing is slotted longitudinally to permit viewing of the cavity adjoining the transparent dielectric plate.

21. An electronic manometer of the character described in claim 20 in which the housing is transparent at the edges of the cavities and the dielectric plates to permit viewing of both cavities.

22. An electrical manometer including a housing with a longitudinal axis, first and second cavities within the housing with axes parallel to and symmetrical with respect to the longitudinal axis, first and second ports connected respectively to the first and second cavities at one end of the housing, third and fourth ports connected respectively to the first and second cavities at the other end of the housing, a first dielectric plate within the housing with a flat side contiguous to the first cavity along its length and an opposite side, isolated from the first cavity and in contact with a first layer of electrically conductive material, a second dielectric plate within the housing with a flat side contiguous to the second cavity along its length and an opposite side isolated from the second cavity and in contact with a second layer of electrically conductive material, a first electrical lead connected to the first conductive layer, a second eletrical lead conneted to the second conductive layer, an eletrode within the first cavity and an electrode within the second cavity.

23. An electrical manometer of the character described in claim 22, in which the two cavities are connected at one end of the housing by a passage joining the third and fourth ports.

References Cited

UNITED STATES PATENTS

| 2,703,867 | 3/1955 | Edmundson et al. __ 73—398 XR |
| 2,746,295 | 5/1956 | Lubkin _____ 73—398 |
| 2,944,199 | 7/1960 | Hudson _____ 73—398 XR |
| 3,190,122 | 6/1965 | Edwards _____ 73—398 |
| 3,218,863 | 11/1965 | Calvert _____ 73—398 |

FOREIGN PATENTS

| 626,217 | 1949 | Great Britain. |

DAVID SCHONBERG, *Primary Examiner.*

D. O. WOODIEL, *Assistant Examiner.*